(12) United States Patent
Laws

(10) Patent No.: US 6,609,256 B1
(45) Date of Patent: Aug. 26, 2003

(54) EXPANDABLE SHOWER ENCLOSURE

(75) Inventor: Adam Timothy Laws, Birchgrove (AU)

(73) Assignee: Expanda Suite Pty Ltd, Queensland (AU)

( * ) Notice: Subject to any disclaimer, the term of this patent is extended or adjusted under 35 U.S.C. 154(b) by 0 days.

(21) Appl. No.: 09/831,015

(22) PCT Filed: Nov. 5, 1999

(86) PCT No.: PCT/AU99/00970

§ 371 (c)(1),
(2), (4) Date: Jul. 30, 2001

(87) PCT Pub. No.: WO00/27266

PCT Pub. Date: May 18, 2000

(51) Int. Cl.[7] ................................................. A47K 3/22
(52) U.S. Cl. ................................ 4/599; 4/612; 52/79.4
(58) Field of Search ............................ 4/549, 550, 552, 4/596, 599, 600, 612, 613, 614; 52/79.4, 79.7, 79.9, 264

(56) References Cited

U.S. PATENT DOCUMENTS 2,466,378 A  *  4/1949  Charteris ................... 4/599 X
2,518,060 A  *  8/1950  Pickles ...................... 4/612 X
3,060,453 A  * 10/1962  Swan ......................... 4/612 X
4,064,570 A    12/1977  Kim

FOREIGN PATENT DOCUMENTS

| DE | 19602919 | 7/1997 | |
| EP | 18299 | * 10/1980 | ................ 4/552 |
| GB | 2316609 | 3/1998 | |
| WO | 96/11124 | 4/1996 | |

* cited by examiner

Primary Examiner—Robert M. Fetsuga
(74) Attorney, Agent, or Firm—Wallenstein & Wagner, Ltd.

(57) ABSTRACT

A shower enclosure comprises a stationary structure (1) and a movable structure (2). The movable structure (2) has a curved wall panel (10), a floor (11) and an upper member (12). A curved door (14) is pivotally hinged to the movable structure (2). The movable structure (2) is pivotally connected to the stationary structure (1) about axis Y1. The movable structure (2) can be moved from a standby or storage position in which the movable structure (2) is stowed inside the stationary structure (1) to an in-use position in which the movable structure (2) is pivoted outwardly from the stationary structure (1) to form a larger shower enclosure.

7 Claims, 5 Drawing Sheets

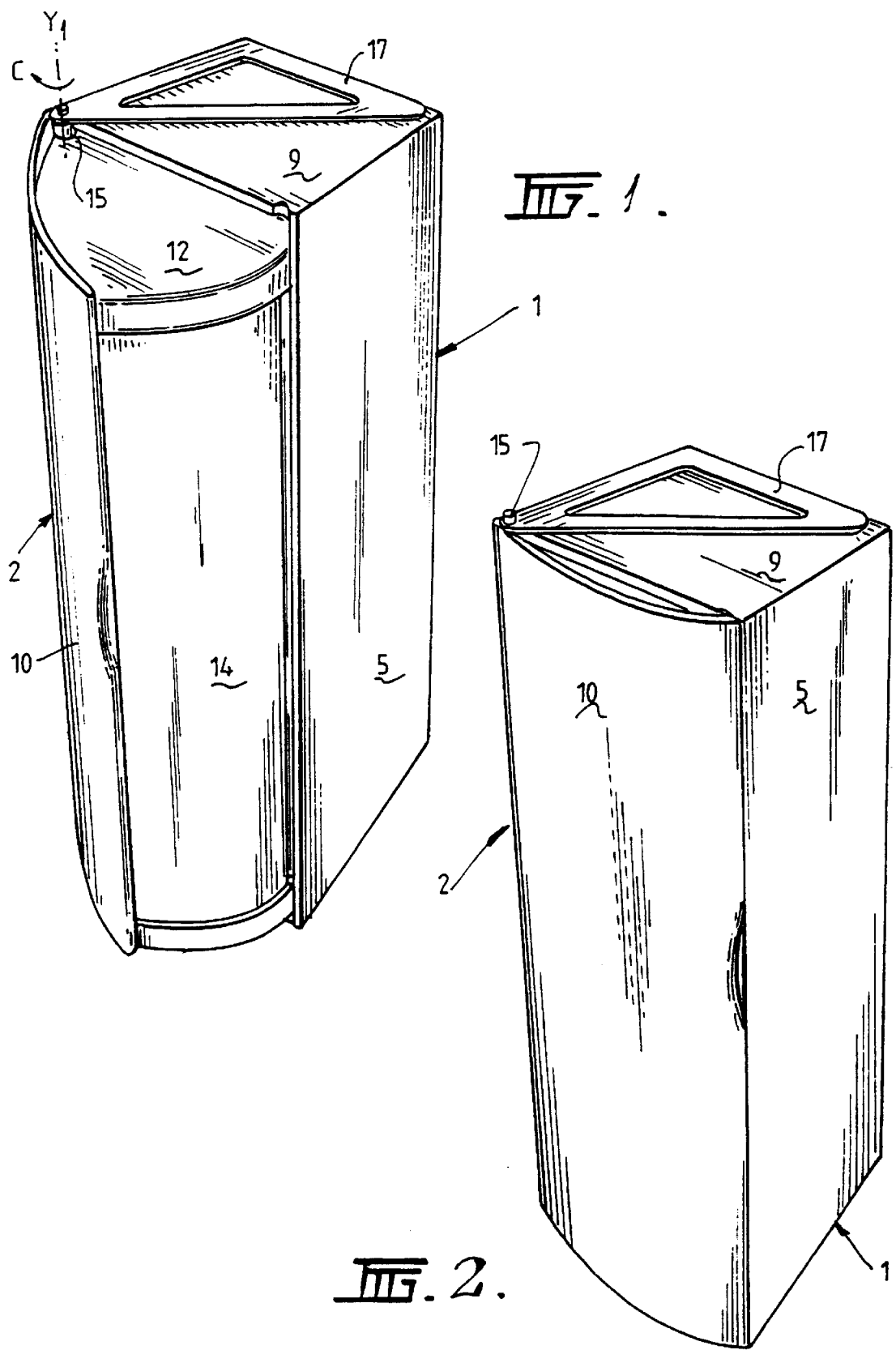

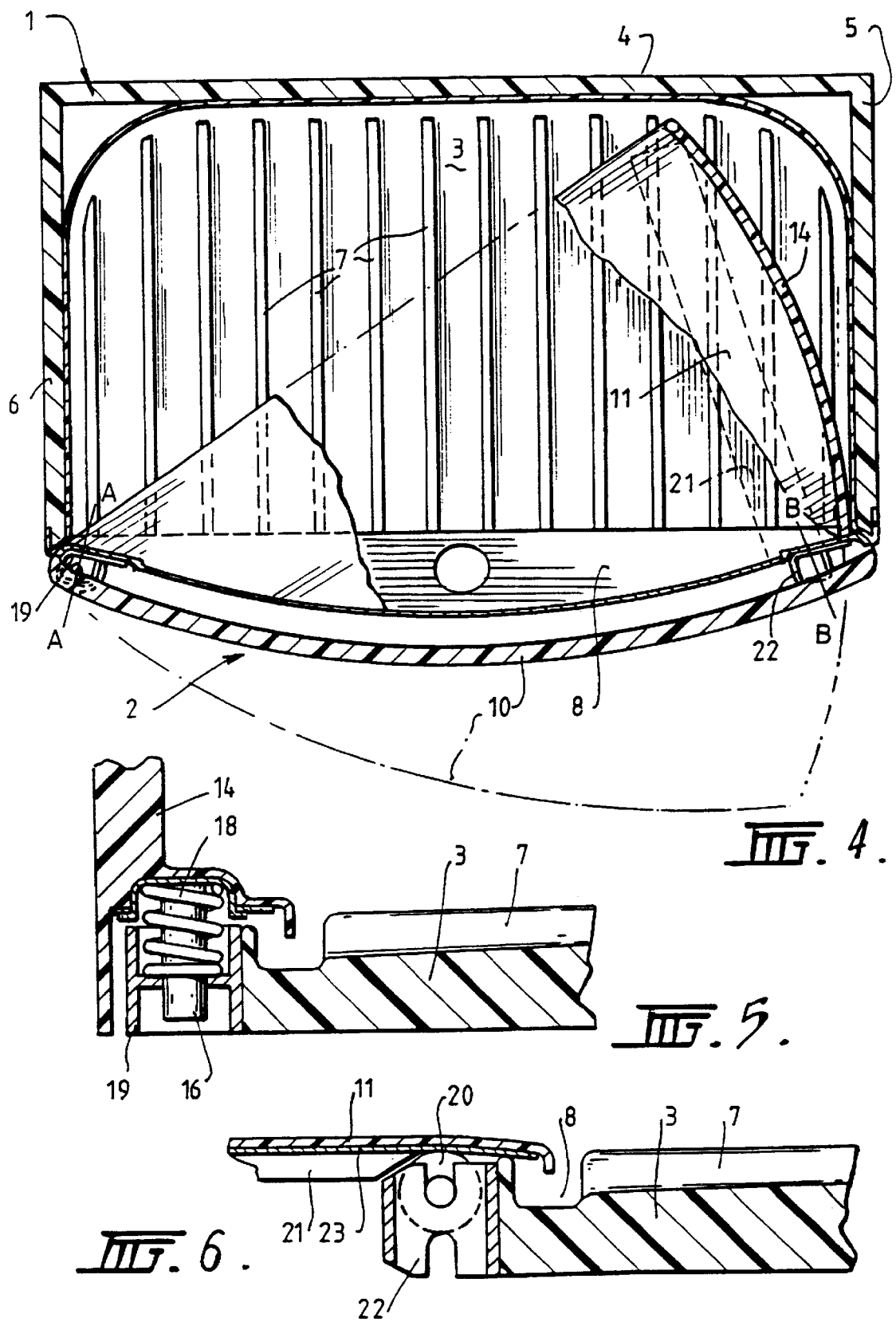

EXPANDABLE SHOWER ENCLOSURE

The invention is described in the following statement:

TECHNICAL FIELD

This invention relates to shower cubicles, and in particular to shower cubicles adapted for incorporation in a confined space, such is often found, for example in an ensuite, a mobile home, a boat or the like. The invention is primarily described in relation to a mobile home of the kind referred to as a motor home which is, frequently at any rate, a small bus type vehicle fitted out internally with cupboards, toilets, a small stove, bunks, and fittings of that nature, but it is not restricted to that embodiment. The invention is well adapted for incorporation in any portable or permanent structure in which space and floor area are limited. The invention also relates to a component or system for retrofitting to existing shower cubicles to increase the effective size of such shower cubicles.

BACKGROUND ART

In most motor homes it is necessary to have a shower recess or a shower cubicle. When not in use, the shower cubicle is objectionable, in that it is obtrusive and takes up considerable floor area that could, with advantage be used for other purposes. There are known types of shower cubicles which are expansible by virtue of sliding overlapping walls. Examples of these are taught in International Patent Publication No. W096/11124 and French patent 2252-073 These known types of expansible shower cubicles allow for the possibility of reducing the floor area occupied by the cubicle when not in use. However, a number of disadvantages exist with such shower cubicles. Firstly the necessary track and slide means for the movable side walls encroach into the useable cubicle space. Secondly, they include complex arrangements to provide a drainage floor pan which is useable in the in use configuration and concealed during a standby configuration.

SUMMARY OF INVENTION

The present invention provides a shower cubicle comprising a stationary structure and a movable structure, said stationary structure having a first floor portion, a rear wall extending substantially along a rear edge of said first floor portion, and two side walls coinciding with respective side edges of said first floor portion, said movable structure having a wall panel, and a second floor portion, said movable structure pivotally connected to said stationary structure about a substantially vertical first axis; said cubicle admitting of two configurations, namely an in-use configuration wherein said movable structure is in a pivotally outward position, and a standby configuration in which said second floor portion is substantially stowed within said stationary structure and said wall panel of said movable structure substantially spans between said two side walls of said stationary structure.

Preferably said movable structure has an upper member projecting from said wall panel.

Preferably, said movable structure also has an entry door.

Preferably said entry door is pivotally hinged about a substantially vertical second axis between said upper member and said second floor portion.

Preferably, at least a part of said first floor portion is recessed to constitute a drainage pan.

Preferably said shower cubicle further comprises a lifting mechanism for lifting said movable structure as it is pivotally moved from said in-use configuration to said standby configuration, thereby allowing said second floor portion to raise above and travel over said first floor portion. The lifting mechanism preferably comprises a ramp mechanism, preferably having a roller or wheel mounted at or near the front edge of the first floor portion and a ramp track located underneath the second floor portion. Other mounting positions of the wheel and ramp track may also be used.

Preferably said stationary structure has a ceiling member.

Preferably said stationary structure is an integrally formed plastic unit.

Preferably upper and lower pivots defining said first substantially vertical axis are attached to said stationary structure.

Preferably said wall panel is curved.

Preferably said entry door is curved.

In a second aspect, the present invention provides an apparatus for connecting to a shower cubicle, said apparatus comprising a compartment having a floor means and a walls means, and a connection means for connecting said compartment to the shower cubicle, characterised in that said compartment is pivotally moveable with respect to said shower cubicle when connected thereto.

Preferably, the connection means comprises a lower bracket for mounting to a lower part of the shower cubicle, said lower bracket including pivotal mounting means for pivotally mounting said compartment thereto.

In another embodiment, the connection means comprises an upper bracket for mounting to an upper part of the shower cubicle, said upper bracket including pivotal mounting means for pivotally mounting said compartment thereto. More preferably, the mounting means comprises both the upper bracket and the lower bracket as described above.

In another embodiment, the connection means comprises upper and lower mounting means on said compartment that engage with complementary upper and lower mounting means on the shower cubicle to thereby pivotally mount the compartment to the shower cubicle.

The apparatus of the second aspect of the present invention preferably further comprises a lifting mechanism for lifting said compartment as it is pivotally mounted from an in use configuration to a standby configuration, thereby allowing the floor means of the compartment to raise above and travel over a floor of the shower cubicle. The lifting mechanism preferably comprises a ramp mechanism, preferably having a roller or wheel that interacts with a ramp track to thereby lift the forward cubicle as it is moved from an open position to a closed position.

The ramp mechanism is preferably formed on an underside part of the compartment. The wheel or roller may be mounted to the lower bracket or to the shower cubicle.

The compartment may further comprise an entry door. The entry door may be pivotally mounted to the compartment. The entry door allows easy entry and egress into and from the shower when the compartment is in use.

The lower bracket may also be provided with a false floor extending, in use, into the shower cubicle. The false floor is provided to ensure that an even or level floor is achieved in the shower cubicle and the forward compartment. If the lower bracket is not provided with a false floor, a false floor may preferably be fitted to the shower cubicle.

BRIEF DESCRIPTION OF THE DRAWINGS

The present invention will now be described by way of example, with reference to the accompanying drawings in which:

FIG. 1 is perspective view of a shower cubicle according to the invention shown in its in use configuration;

FIG. 2 is a perspective view of the shower cubicle of FIG. 1 shown in its standby configuration;

FIG. 4 is an enlarged planned schematic view of the shower cubicle shown in FIG. 1;

FIG. 5 is a sectional view of the door pivot mechanism of the shower cubicle shown in FIG. 4 through lines AA;

FIG. 6 is an enlarged sectional view of the door ramp mechanism of the shower cubicle in FIG. 4 through lines BB;

BEST MODE OF CARRYING OUT INVENTION

Figure 3:
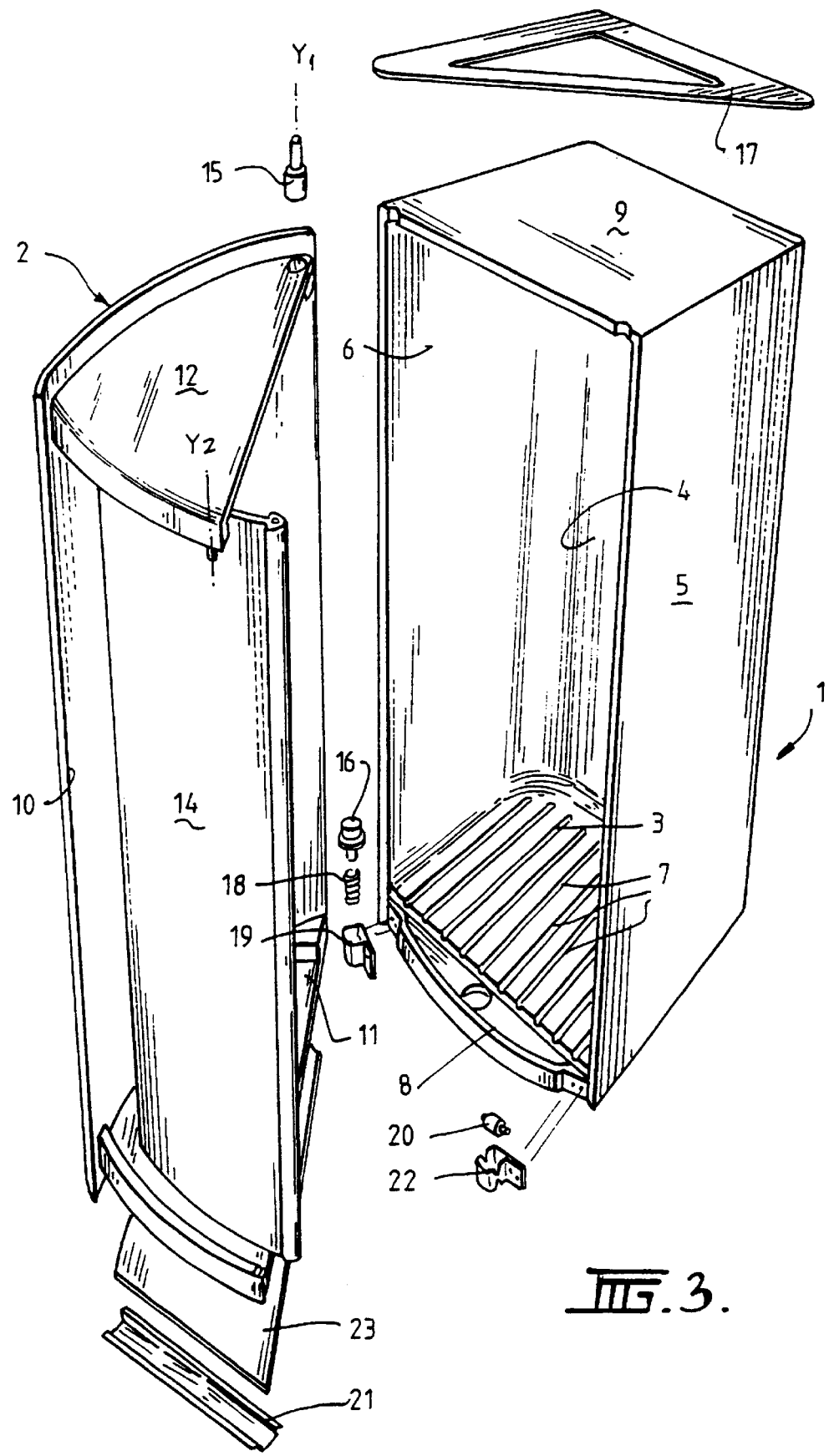
FIG. 3 is an exploded perspective view showing the components of the shower cubicle shown in FIG. 1.

The shower cubicle of the preferred embodiment comprises of a stationary structure 1 and a movable structure 2 pivotally connected thereto about a vertical axis $Y_1$. The stationary structure 1, which is preferably an integral plastic unit, comprises a stationary floor 3, a rear wall 4 extending substantially along a rear edge of the floor 3, two side walls 5 and 6 coinciding with respective side edges of the floor 3, and a ceiling member 9. The floor 3 has a plurality of ribs 7 formed thereon. A recessed drainage pan 8 is also formed along the front edge of the floor 3.

The moveable structure 2 comprises a curved wall or closure panel 10 from which extends a floor portion 11 near its bottom edge and an upper member 12 extending from its upper edge. The wall panel 10, floor portion 11 and upper member 12 are preferably an integrally moulded plastic unit. The floor portion 11 has structural steel member 23 thereunder. A curved door 14, which is preferably made of acrylic plastic, is pivotally hinged to the movable structure 2 about a vertical axis $Y_2$ between the upper member 12 and the floor portion 11. The movable structure 2 is pivotally connected to the stationary structure 1 about axis $Y_1$ by means of pivot members 15 and 16. A steel triangular brace member 17 is fitted to the stationary structure 1 and is adapted to receive the upper pivot 15 which engages with the movable structure 2. The lower pivot 16 is adapted to engage with a spring 18 contained within a housing support member 19 attached to the lower portion of the stationary structure 1. The spring 18 is preferably adapted to support 90% of the weight of the movable structure 2.

In use the movable structure 2 is adapted to be movably pivoted between a standby configuration to an in-use configuration. In the standby configuration the wall panel 10 spans between the side walls 5 and 6, and the door 14 which is pivotally connected thereto is substantially housed within the enclosed space of the shower cubicle, as shown in FIGS. 2 and 4. In order to open the shower cubicle to an in-use configuration the wall panel 10 is pivotally rotated in a clockwise direction C as shown in FIG. 1.

In the in use configuration the floor portion 11 of the movable structure 2 is at the same level as the floor 3 of the stationary structure 1, and the bottom edge of the wall panel 10 seats firmly on the floor structure of the mobile home or other space in which the shower cubicle stands. However, as the movable structure 2 is pivotally moved to the standby configuration in an anticlockwise direction, a door ramp mechanism as shown in FIG. 6, which includes a roller wheel 20 rotatably mounted to a housing 22 secured to the front edge of floor 3, and a ramp track 21 underneath the floor portion 11, is used to lift the movable structure 2 as it is moved inwardly, in order to allow floor portion 11 to raise above and travel over the drainage pan 8 and the floor 3 of the stationary structure 1.

An advantage of the present invention, is that the interior of the shower cubicle does not contain tracks or guideways which intrude into the useable space of the shower cubicle as occurs in the number of known expansible shower cubicles. Furthermore, the shower cubicle in it sin-use configuration provides for greater space and access through the door 14, whilst in the standby or collapsed configuration the substantial part of the upper member 12, floor portion 11 and door 14 are substantially stowed away or housed inside the stationary structure. Furthermore, the curved wall panel 10 provides an aesthetically pleasing arrangement.

A further advantage of this embodiment is that the integrally moulded plastic movable structure 2 is symmetrical and may be inverted such that the upper member 12 becomes the floor portion 11 and vice versa. During construction the pivots 15 and 16 may be positioned near side wall 5 rather than side wall 6, and the shower cubicle would then become left side opening, rather than right side opening as shown in the above mentioned embodiment. In such a left side opening embodiment the brace member 17 need only be flipped over to suite the configuration, and the housing support member 19 and roller wheel 20/housing 22 flipped over and swapped around to suit such configuration.

Figure 7:
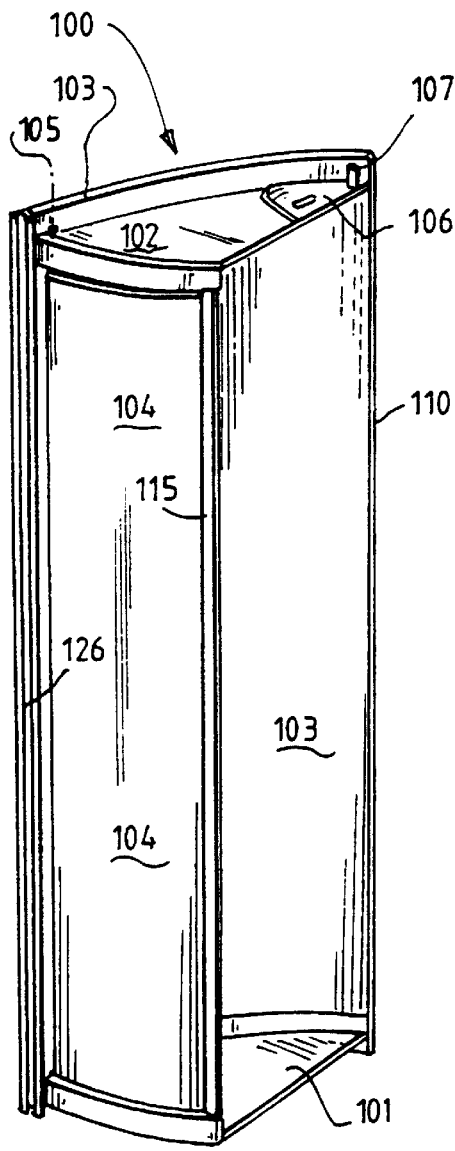
FIG. 7 is a perspective view of a compartment in accordance with the second aspect of the present invention.
Figure 8:
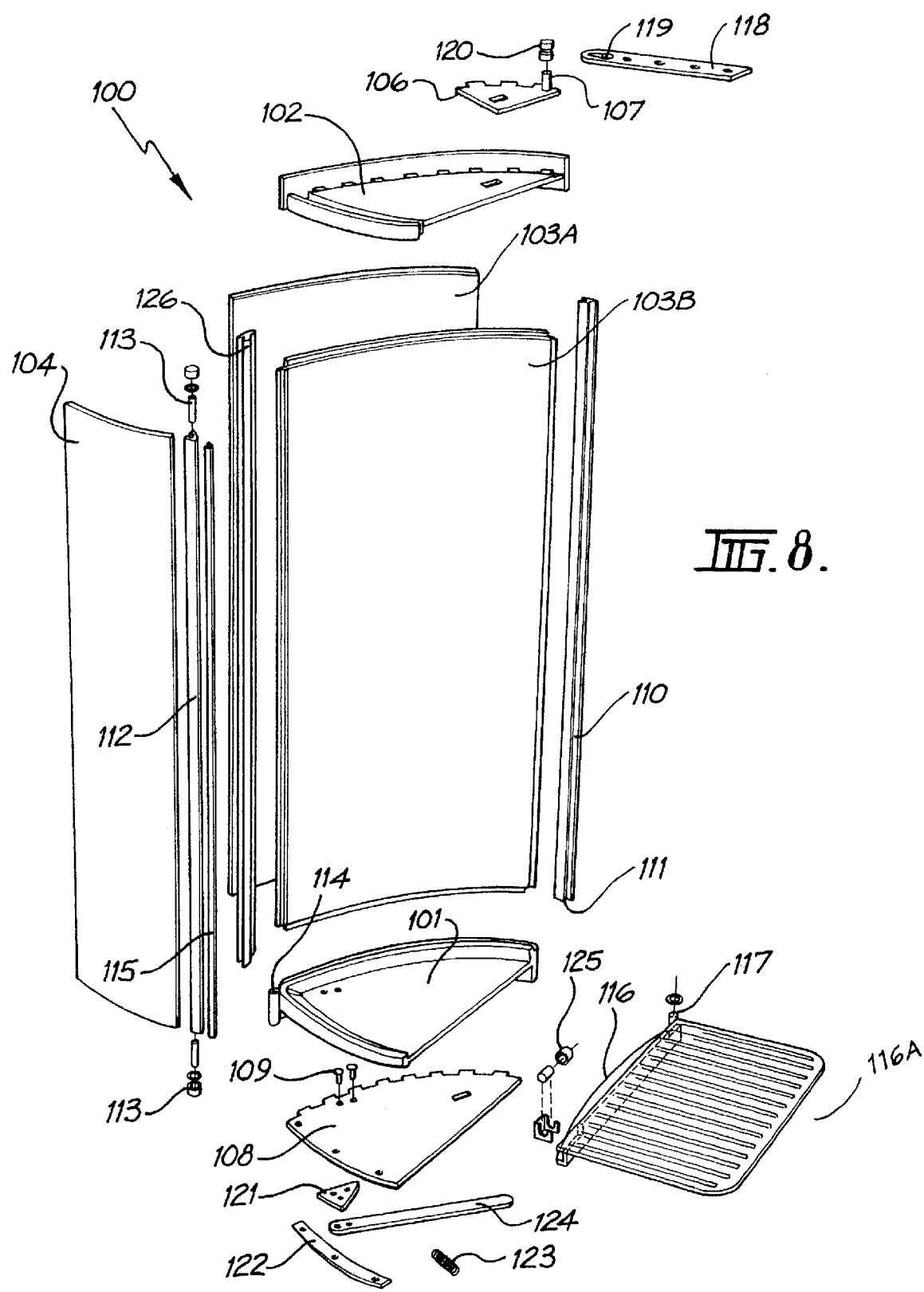
FIG. 8 is an apart and in-line for assembly view of a preferred embodiment of the apparatus of the second aspect of the invention.

The apparatus in accordance with the second aspect of the present invention is shown in FIGS. 7 and 8. Referring first to FIG. 7, the apparatus includes a compartment 100. This compartment 100 comprises a forward compartment when in use in a shower cubicle and will be referred to hereinafter as the forward compartment. The forward compartment 100 also comprises a curved wall 103 and an entry door 104. The forward compartment 100 also comprises a curved wall or closure panel 103 and an entry door 104. Entry door 104 is pivotally mounted along vertical axis 105 to the forward compartment 100. The ceiling 102 of the forward compartment 100 is provided with bracket 106 fixed thereto. Bracket 106 includes upwardly extending projection 107. The function of upwardly extending projection 107 will be described in more detail hereunder.

Turning now to FIG. 8, which shows the forward compartment of FIG. 7 apart and in line for assembly, as can be seen, the floor 101 of the forward compartment comprises a moulded plastic unit. A base support 108 is fixed to the underside of floor 101 by means of suitable fixing means 109. The base support is preferably made from aluminium plate and is designed to increase the strength of the floor 101.

The wall 103 includes an outer panel 103A and an inner panel 103B. Outer panel 103A and inner panel 103B are fixed to the floor 101 by inserting the respective lower edges thereof into suitable shaped receiving means formed in the floor 101. Similarly, the upper edges of outer panel 103A and inner panel 103B are received in suitable shaped receiving means formed in the ceiling 102.

The forward compartment 100 also includes a pivot edge extrusion 110 that forms one of the vertical edges of the forward compartment 100. Pivot edge extrusion 110 includes an opening 111 which receives a projecting member formed on the lower connecting bracket. This will be described in further detail hereunder.

The forward compartment also includes entry door 104. Entry door 104 is attached to entry door extrusion 112. Entry door extrusion 112 receives entry door pivot assembly 113. Lower entry door pivot assembly 113 engages hole 114 formed in the floor 101. Similarly, the upper entry door pivot assembly is received in a similar hole (not shown) formed in ceiling 102. By this mechanism, the entry door 104 is pivotally mounted to the forward compartment 100. Effectively, entry door 104 is hingedly mounted to the forward compartment 100. The entry door is also provided with a door seal 115.

The apparatus of the second aspect of the present invention also includes lower bracket 116. Lower bracket 116 is designed to be fixed to the lower most forward edge of a shower cubicle. Lower bracket 116 includes an upwardly extending projection 117. Upwardly extending projection 117 is designed to fit into opening 111 on pivot edge extrusion 110 such that the pivot edge extrusion 110 becomes pivotally mounted to lower bracket 116. It will be understood that this results in the forward compartment 100 being pivotally mounted to the lower bracket 116.

The apparatus may further include an upper bracket 118 that is affixed to an upper part of the shower cubicle. Upper bracket 118 includes aperture 119 for receiving upwardly extending projection 107 on bracket 106. A top pivot bearing assembly 120 is preferably fitted to upwardly extending projection 107 to assist in smooth pivotal operation of the forward enclosure 100.

As will be appreciated, the forward compartment 100 is pivotally mounted to both the lower bracket 116 and the upper bracket 118, which thereby allows the forward compartment to be moved about the respective pivot points on the upper and lower brackets.

The apparatus of the second aspect of the present invention also includes a lift mechanism that is essentially the same as that shown in FIG. 6. The components of this lift mechanism are also shown in FIG. 8, and they include a load spreader 121 a base ramp 122, a ramp spring 123, a main spring 124 and a wheel and axle assembly 125.

Finally, the apparatus also includes a further edge extrusion 126 for holding respective edges of the outer panel 103A and inner panel 103B of wall 103.

When the apparatus shown in FIGS. 7 and 8 is connected to an existing shower cubicle, the apparatus works essentially the same as the apparatus shown in FIGS. 1 to 6. However, it may be necessary to provide the shower cubicle with a false floor 116a in order to obtain a flat or even floor in the shower during use. The false floor 116a may be provided by fitting the false floor into the existing shower cubicle, or by providing the lower bracket 116 with a false floor that extends into the shower cubicle (FIG. 8).

Figure 9:
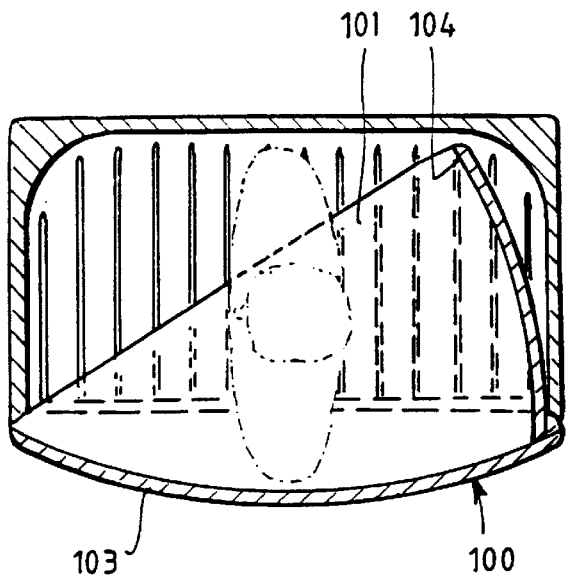
FIG. 9 is a plan view of the shower cubicle in accordance with the present invention in a closed configuration.
Figure 10:
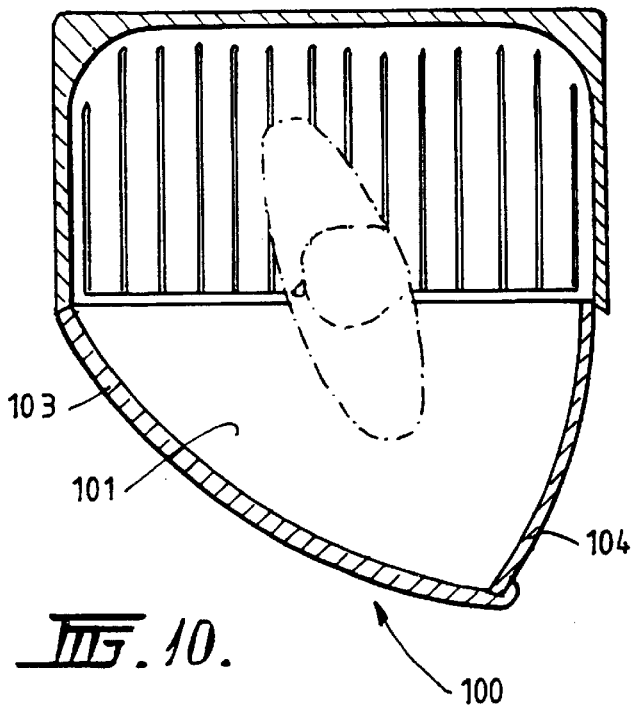
FIG. 10 is a plan view of the apparatus of FIG. 9 in an open configuration.

The benefits of the present invention in providing a larger shower enclosure are demonstrated with reference to FIGS. 9 and 10. In FIG. 9, the shower cubicle is in its closed position. As can be seen, there is only a small amount of room in the shower cubicle when in that closed position. However, when the shower cubicle is opened to its extended position, as shown in FIG. 10, significantly greater room is provided inside the cubicle.

In other not shown embodiments the earlier mentioned door ramp mechanism may be replaced by some other suitable door lifting device such as a gas strut, mechanical lever or the like.

What is claimed is:

1. A compartment for connecting to a shower cubicle, said compartment comprising a floor a closure panel, an entry door pivotally mounted to the closure panel, and a connection means for pivotally connecting said compartment to the shower cubicle, said compartment being pivotally moveable with respect to said shower cubicle when connected thereto such that said compartment is moveable between a standby configuration and an in-use configuration, wherein in the standby configuration the entry door is substantially stowed within an enclosed space of the shower cubicle and the closure panel closes off the shower cubicle, and in the in-use configuration, said compartment pivots about said connection means onto an open position and said entry door extends beyond the enclosed space of the shower cubicle to define an entry opening to the shower cubicle.

2. A compartment as claimed in claim 1 wherein said connection means comprises a lower bracket for mounting to a lower part of the shower cubicle, said lower bracket including pivotal mounting means for pivotally mounting said compartment to said shower cubicle.

3. A compartment as claimed in claim 1 wherein said connection means further comprises an upper bracket for mounting to a lower part of the shower cubicle, said upper bracket including pivotal mounting means for pivotally mounting said compartment to said shower cubicle.

4. A compartment as claimed in claim 1 wherein said connection means further comprises upper and lower mounting means on said compartment that engage with complementary upper and lower mounting means on said shower cubicle to thereby pivotally mount said compartment to said shower cubicle.

5. A compartment as claimed in claim 1 further comprising a lifting mechanism for lifting said compartment as it is pivotally mounted from the in-use configuration to the standby configuration, thereby allowing the floor means of the compartment to raise above and travel over a floor of the shower cubicle.

6. A compartment as claimed in claim 5 wherein said lifting mechanism includes a ramp mechanism on an underside of the floor of the compartment.

7. A compartment as claimed in claim 2 wherein said lower bracket includes a false floor that extends into the shower cubicle when said lower bracket in mounted to said shower cubicle.

* * * * *